Aug. 8, 1939.  E. L. ROSE ET AL  2,168,656
POWER TRANSMISSION
Filed Feb. 16, 1937   6 Sheets-Sheet 1
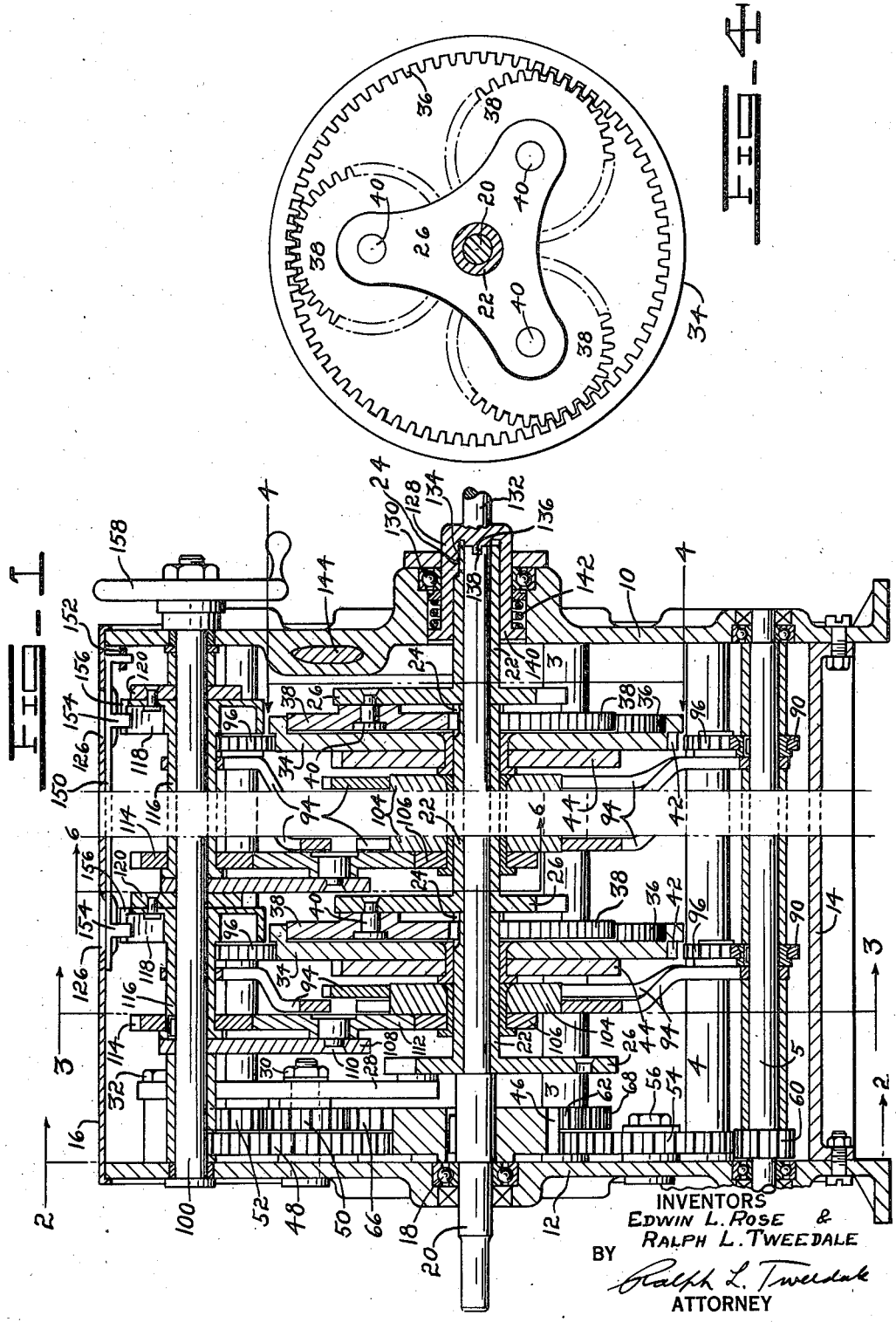
INVENTORS
EDWIN L. ROSE &
RALPH L. TWEEDALE
BY
Ralph L. Tweedale
ATTORNEY

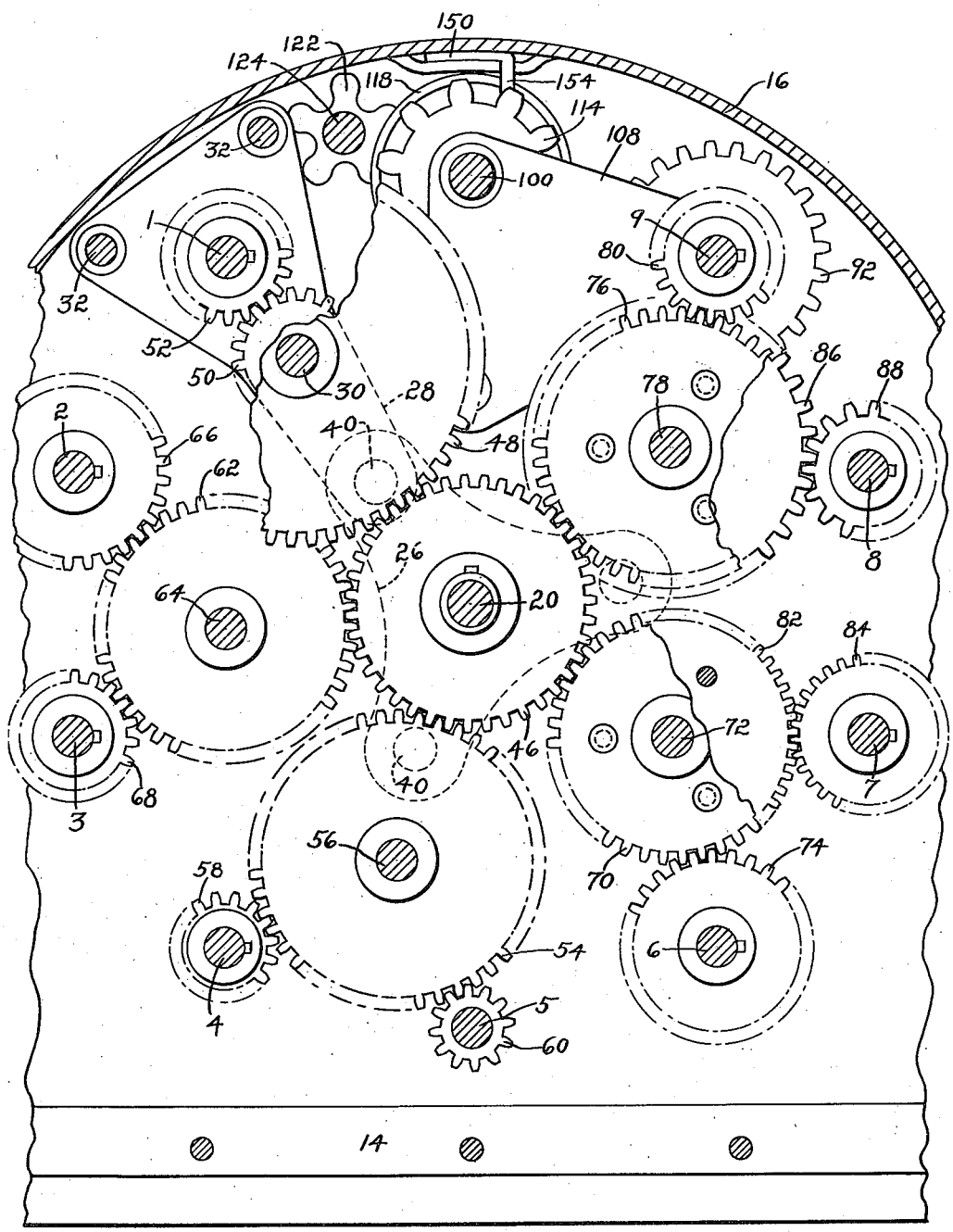

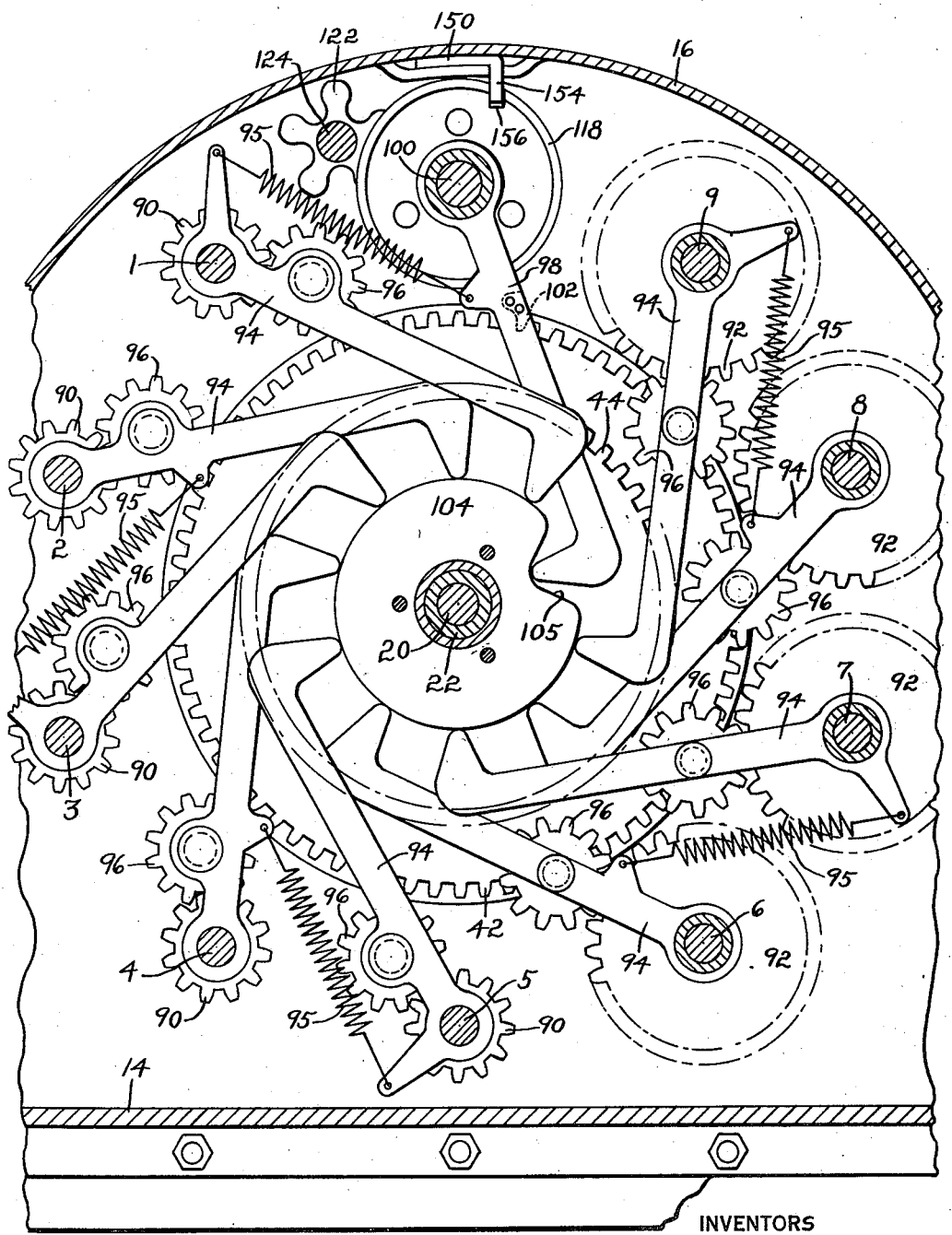

Aug. 8, 1939. E. L. ROSE ET AL 2,168,656
POWER TRANSMISSION
Filed Feb. 16, 1937  6 Sheets-Sheet 4
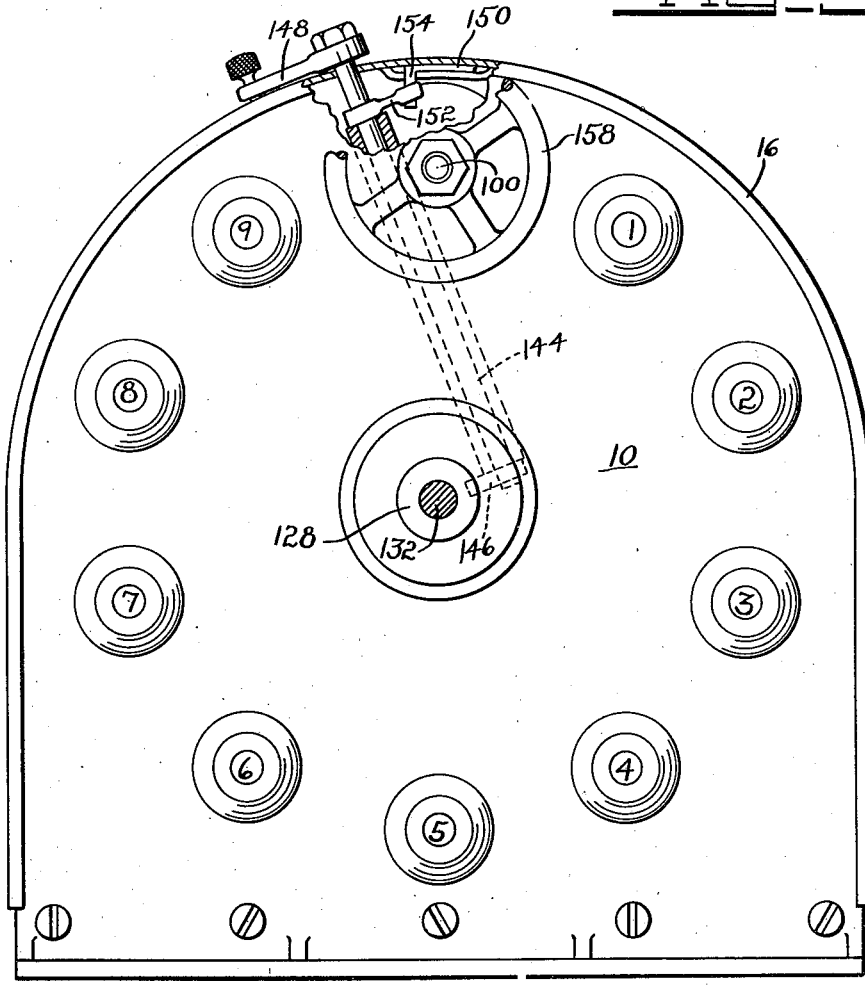
INVENTORS
EDWIN L. ROSE &
RALPH L. TWEEDALE
BY
Ralph L. Tweedale
ATTORNEY

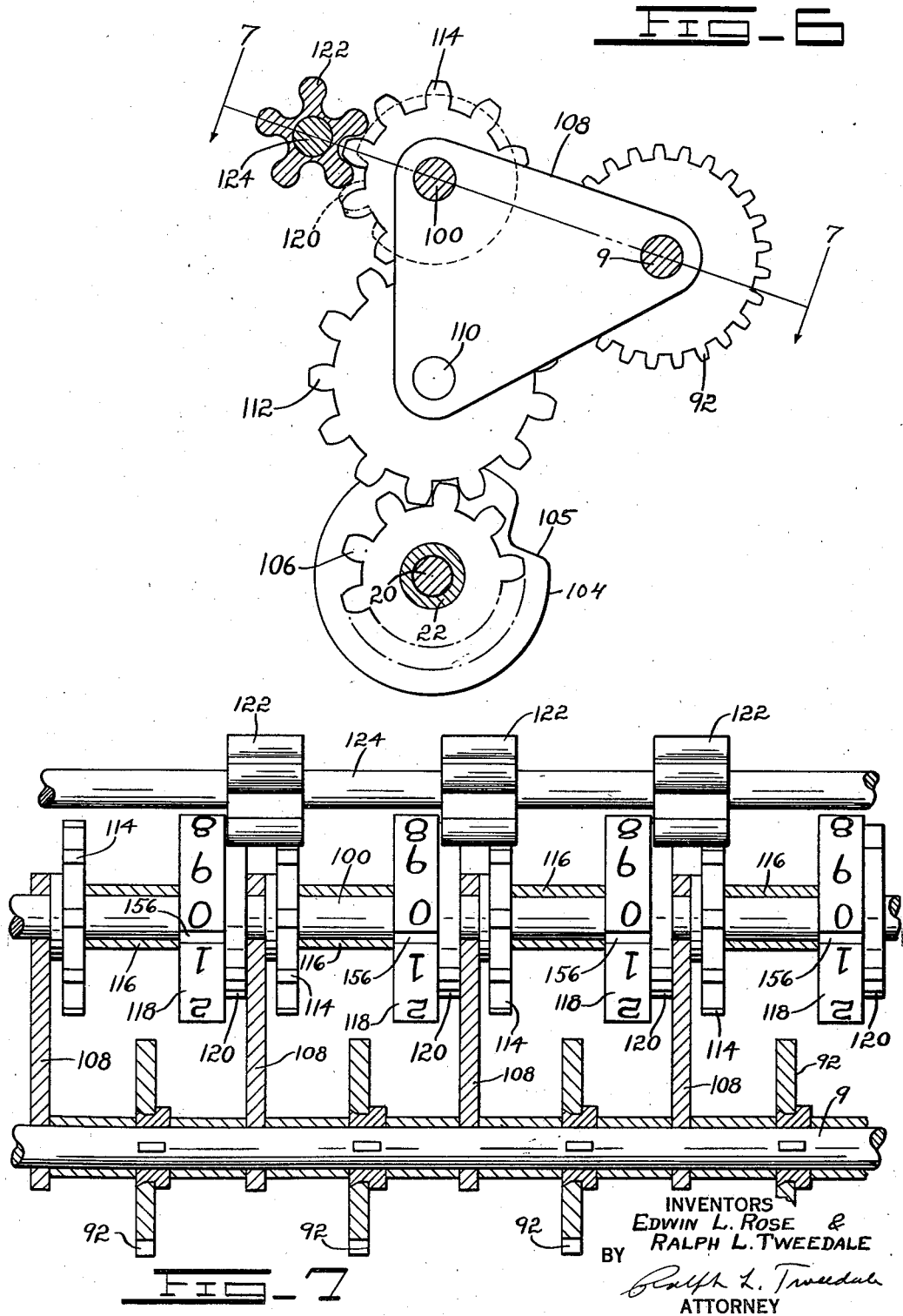

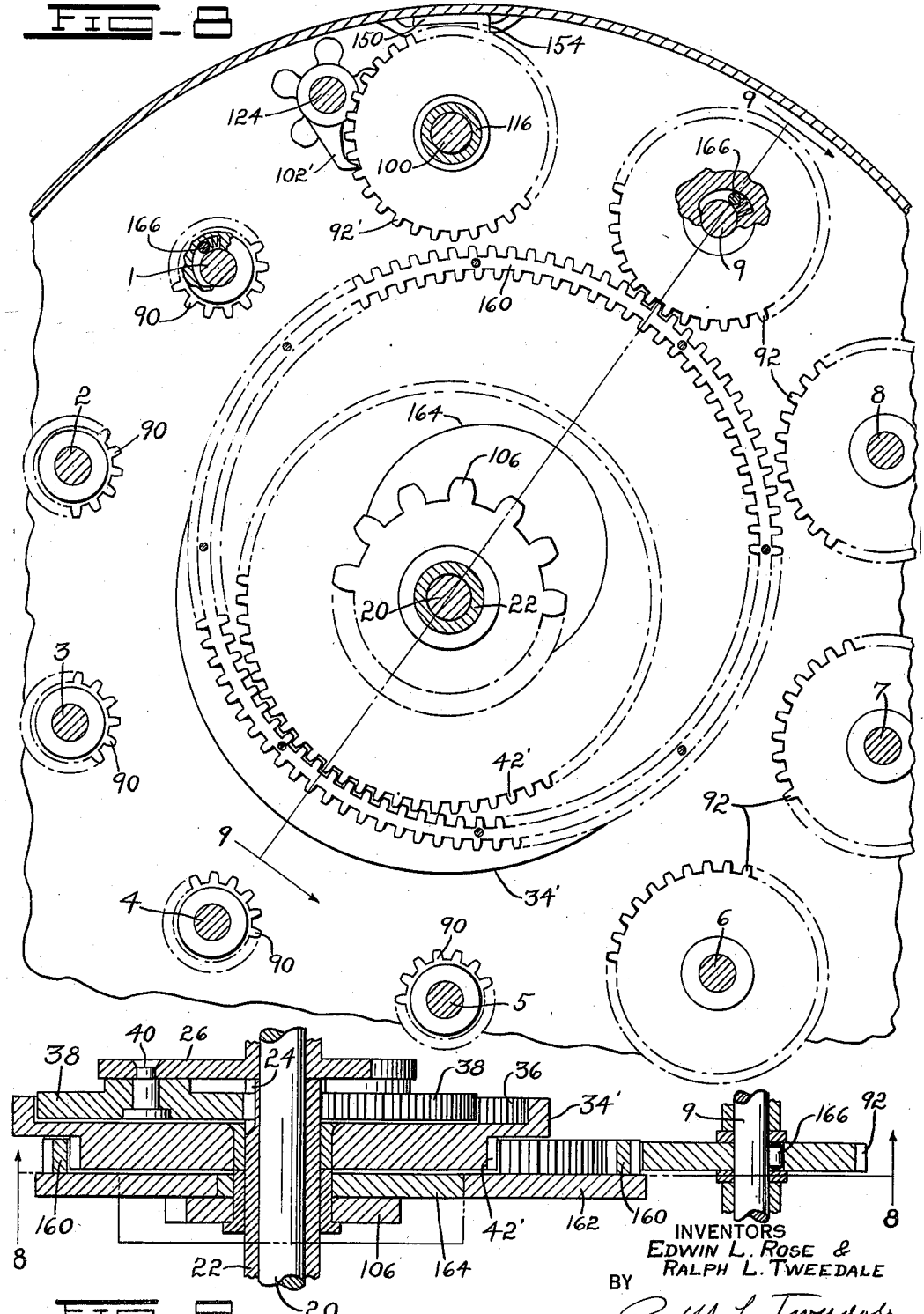

Patented Aug. 8, 1939

2,168,656

UNITED STATES PATENT OFFICE 2,168,656

POWER TRANSMISSION

Edwin L. Rose, Watertown, and Ralph L. Tweedale, Waterbury, Conn., assignors to The Waterbury Tool Company, Waterbury, Conn., a corporation of Connecticut Application February 16, 1937, Serial No. 126,022

12 Claims. (Cl. 74—283)

This invention relates to power transmissions, particularly those of the variable ratio type wherein a driving member and a driven member may be connected together at different speed ratios. Variable ratio transmissions are of two general classes; one of which is the positive driving type, such as a change speed gear box; the other of which is the infinite ratio type exemplified by the well-known hydraulic, friction or electric transmissions. The positive type presents the advantage that the speed ratio at any particular setting of the transmission is absolutely fixed and unvarying regardless of loading conditions and other variable factors. They have a disadvantage, however, that it is difficult to provide a large number of ratio settings without making the device extremely large, complicated, expensive and inefficient. The infinite ratio type provides a completely stepless change in ratio so that the device may be set to provide any speed ratio whatsoever within its range of operation. It is impossible, however, to maintain a given ratio setting with absolute accuracy under varying load and other conditions which effect the slippage of the transmission.

In many power transmission applications a large number of speed ratios must be available and this necessitates the use of an infinite ratio type of transmissions; since a positive type, providing a sufficient number of ratios, would be entirely unfeasible. With the infinite ratio type it is difficult to maintain absolute constancy of speed ratio at any setting so that it is necessary to adjust the transmission setting by trial and error whenever it is necessary to change the ratio, and a frequent check on the setting must be made during operation.

The present invention is concerned with a power transmission of the positive type in which the number of ratios available is finite but so large as to be, for all practical purposes, infinite; in other words, to provide for changing the ratio by the smallest steps which would ever be required in a particular application.

It is an object to provide a transmission of this character in which the available ratios are arranged in arithmetical progression and in which the mechanism is arranged in compact form.

A transmission of this character, for example, may be used as a pilot control for an infinite type of transmission, in which case the infinite type transmission may be of sufficient capacity to handle the entire load being transmitted while the positive transmission may be small and of light construction capable of transmitting only sufficient effort to operate the control of the infinite transmission. Likewise, in many other applications, such as price indicating gasoline pumps, it is desirable to have a compact gear set which provides selectively a large number of ratios.

It is also an object to provide a transmission of the type described wherein the ratio setting may be controlled by progressive equal steps through the operation of a single rotary shaft, preferably one which partakes of a large number of revolutions in covering its full range. A device of this character is valuable in computing machines since it may serve to provide a continuous product of two variable velocities.

These objects are achieved by the provision of a multiple speed gear set which comprises a plurality of planetary differential gears connected in series; that is, the input member of each differential may be connected to the output member of the next adjacent differential or stage. The third or control member of each differential may be driven at any one of several ratios from the input shaft or may be held stationary, the overall ratio being determined by the combined effects of the particular ratios of the control member of the differential at each stage.

By analogy to the theory of numbers the structure may be considered in certain aspects as a mechanical number system and may be constructed upon any base number, which, of course, is the number of digits in the system, including zero. For convenience the form of the invention chosen for illustration is based on the decimal system; that is, in which the base number is 10, although it will be understood that the principles involved may be incorporated in transmissions built upon a system having a larger or smaller base number.

While it has been proposed heretofore to use differential gears to add together the outputs of a plurality of variable ratio gear sets, such as the common cone cluster gears, in a manner to provide an arithmetical progression of speed ratios, such a system requires the introduction of a fixed multiplying gearing for each variable ratio gear set. The ratio of these multiplying gears must correspond to the successive powers of the base number; for example, in a decimal gear set of such character one multiplying gear must have a factor of one, the next one a factor of ten, the next one a factor of one hundred, etc. This is objectionable not only because the multiplying gears become very cumbersome if any large number of stages are used but also because a separate driving train including the multiplier gearing and the variable ratio gearing must be provided for each stage.

By the present invention these difficulties are avoided by utilizing a planetary differential gearing in which the inherent ratio of the planetary gearing with the control member locked corresponds to the base number of the system. By properly selecting the ratios at which the control member of each stage may be driven, it is possible to provide arithmetical progression of ratios with a common set of driving trains for all stages of the device; that is, with the same multiplying factor, preferably unity, between the input or output shaft and the variable ratio gearing at each stage. These driving trains preferably comprising a set of shafts are arranged circumferentially around the outside of the planetary gears, which are mounted upon a common axis, so that a compact mechanism may be provided in which the number of ratios available is equal to the base number of the system raised to a power equal to the number of differentials or stages in the gear set. For example, in a decimal system only five stages are required to produce one hundred thousand ratios with increments in output speed varying in arithmetical progression.

It is also an object to provide a variable ratio transmission of the character described in which the number of dissimilar parts is substantially reduced. By the present invention the dies and tools necessary to manufacture a transmission of only one stage are all that is necessary to manufacture a transmission having any number of stages. The parts necessary to add to provide additional stages are identical to the parts already present in the first stage except for twelve longitudinal shafts and the casing.

Further objects and advantages of the present invention will be apparent from the following description, reference being had to the accompanying drawings wherein a preferred form of the present invention is clearly shown.

In the drawings:

Fig. 1 is a longitudinal section through a power transmission device incorporating a preferred form of the present invention.

Fig. 2 is a transverse section on line 2—2 of Fig. 1.

Fig. 3 is a transverse section on line 3—3 of Fig. 1.

Fig. 4 is a transverse section on line 4—4 of Fig. 1.

Fig. 5 is an end view of the device.

Fig. 6 is a transverse section on line 6—6 of Fig. 1.

Fig. 7 is a cross section on line 7—7 of Fig. 6.

Fig. 8 is a view corresponding to Fig. 2 showing a modified form of the present invention.

Fig. 9 is a cross section on line 9—9 of Fig. 8.

Referring now to Fig. 1 there is illustrated the first and last stage mechanism of a transmission device which may have any number of additional intermediate stages, each a duplicate of those shown. The device includes a frame or casing comprising the end plates 10 and 12, a bottom plate 14 and a U-shaped cover plate 16. Journalled on bearings 18 in the end plate 12 is a shaft 20 which for the purposes of the present description is considered as the input shaft, it being understood that the device may be operated for transmission of power in either direction therethrough. The shaft 20 forms a central support for much of the interior mechanism. Journalled on the shaft 20 are a plurality of planetary differential gear sets, each of which comprises a sleeve 22 having a pinion 24 formed on its right-hand end which comprises the sun gear of each differential. Each sleeve 22 is also formed with a three-armed spider 26 at its left-hand end forming the planet carrier for the differential next adjacent on the left. The spider 26 for the first stage, that is the one nearest plate 12, is anchored to a plate 28 secured to the plate 12 by suitable fastening means 30 and 32.

Journalled on the sleeve 22 adjacent the sun pinion 24 is a plate 34 having an internal ring gear 36 which forms the orbit gear or control member of each differential. Meshing with the orbit gear 36 and the sun pinion 24 are three planet pinions 38 which are journalled on studs 40 secured to the arms of spider 26. It will be seen that the sleeves 22 form an integral connection between the output—spider 26—of one differential and the input—sun pinion 24—of the next differential to the right. Plate 34 is provided with gear means whereby it may be operated at any one of several speeds. In the present arrangement this means comprises two gears 42 and 44 with which various drive pinions, later to be described, may be brought into mesh.

Keyed to the shaft 20 is a main driving pinion 46 from which are driven nine driving train shafts 1 through 9, inclusive, which are journalled in the end plates 10 and 12. The gearing for driving these shafts is illustrated in Fig. 2 from which it will be seen that, in the plane nearest the plate 12, a large gear 48 meshes with pinion 46 and is journalled on the fastening means 30 for the plate 28. Secured to the gear 48 but in the second plane from plate 12 is a pinion 50 which meshes with a pinion 52 keyed to the shaft 1. Also in the first plane is an idler gear 54 journalled on a fixed stud 56 which meshes with pinions 58 and 60 keyed to the shafts 4 and 5, respectively. In the second plane from the plate 12 is an idler gear 62 journalled on a fixed stud 64 which meshes with pinions 66 and 68 keyed to the shafts 2 and 3, respectively. Also in the second plane is an idler gear 70 journalled on a fixed stud 72 which meshes with a pinion 74 keyed to the shaft 6; and an idler gear 76 journalled on a fixed stud 78 meshing with a pinion 80 keyed to the shaft 9. In the third plane from the plate 12 is a gear 82 secured to the idler gear 70 and meshing with a pinion 84 keyed to the shaft 7 as well as a gear 86 secured to the gear 76 and meshing with a pinion 88 keyed to the shaft 8. Each of the shafts 1 through 9 carries a set of pinions 90 or 92 (see Figs. 1 and 3) there being a pinion on every shaft for each stage of the mechanism, the pinions 90 lying in the plane of the gear 42 on plate 34 of the differential and the pinions 92 lying in the plane of the gear 44.

The shafts 1 through 5 inclusive are adapted to drive the gear 42 of any differential with a reduction ratio of one to six. The shafts 6 through 9 inclusive are adapted to drive the gear 44 of any differential with a reduction ratio of one to two. The ratio between the shaft 20 and the shafts 1 through 5 inclusive are arranged so that shaft 1 is driven at 9/9 the speed of shaft 20. Shaft 2 is driven at 12/9 the speed of the shaft 20. Shaft 3 is driven at 15/9 the speed of the shaft 20. Shaft 4 is driven at 21/9 the speed of the shaft 20 and shaft 5 is driven at 30/9 the speed of the shaft 20. Thus, with the one to six reduction between the shafts 1 through 5 and the gear 42, the overall ratio between shaft 20 and gear 42 is one to nine when the shaft 1 is driving, two to nine when the shaft 2 is driving, three to nine when the shaft 3 is driving, etc.

Correspondingly the shaft 6 is driven from shaft 20 at a ratio of twelve to nine, the shaft 7 at a ratio of fourteen to nine, the shaft 8 at a ratio of sixteen to nine, and the shaft 9 at a ratio of eighteen to nine. Thus, the overall ratio between the shaft 20 and gear 44 is six to nine when the shaft 6 is driving, seven to nine when the shaft 7 is driving, eight to nine when the shaft 8 is driving, and nine to nine when the shaft 9 is driving.

For the purpose of connecting the orbit gear 36 of any differential to any one of the shafts 1 through 9, a plurality of arms 94 are pivoted on the shafts 1 through 9, there being a set of arms for each differential. Each of the arms 94 carries an idler pinion 96 meshing with the corresponding pinion 90 or 92 and which is adapted to mesh with one of the gears 42 or 44 whenever the corresponding arm 94 is moved inwardly toward the shaft 20. An arm 98 is also pivoted on a control shaft 100 journalled in the end plates 10 and 12. The arm 98 carries a detent 102 engageable with the gear 42 for the purpose of locking the same against rotation. The arms 94 and 98 are controlled by a cam 104 having a notch 105 and which is journalled on the sleeve 22 and has rigidly secured thereto a gear 106 (see Fig. 6). Springs 95 are connected between adjacent arms 94 to hold their inner ends in contact with cam 104.

Supported on the shafts 100 and 9 at each stage is a triangular plate 108 which carries a stud 110 on which an idler gear 112 is pivoted and which meshes with the cam driving pinion 106. Meshing with the gear 112 is a gear 114 which is rigidly secured to a sleeve 116, the latter having a drum dial 118 formed on its right-hand end. The sleeve 116 for the first stage is keyed to the control shaft 100, the remainder of the sleeves being freely rotatable thereon. Secured to each drum 118 is a one-tooth Geneva wheel 120 whereby upon one revolution of a drum 118, one tenth of a revolution may be imparted to the sleeve 116 next adjacent on the right. For this purpose a transfer pinion 122 is freely rotatable on a shaft 124 and meshes with both the Geneva wheel 120 and the gear 114. The ratio between each gear 114 and its cam driving gear 106 is one to one. Each of the dial drums lies under a window opening 126 formed in the casing member 16 and carries numerals from zero to nine.

The output of the last stage of the device, namely the sleeve 22, is journalled in a clutch sleeve 128 which in turn is journalled on bearings 130 in the end plate 10. Clutch sleeve 128 carries an output shaft 132 and has internal splines at 134 for non-rotatably connecting the pinion 24 of the last sleeve 22 with the clutch sleeve 128. The internal end face of the clutch sleeve 128 carries a transverse key 136 adapted to engage a key-way 138 in the end of shaft 20 in the position illustrated in Fig. 1. When the clutch sleeve 128 is moved to the right, the parts 136 and 138 are disengaged while the spline 134 remains engaged with the pinion 24. The clutch sleeve 128 is provided with a flange 140 on its left-hand end against which a spring 142 abuts to bias the sleeve 128 to the left. A diagonally mounted shaft 144 carries an arm 146 (see Fig. 5) abutting against the left-hand face of flange 140.

At the upper end the shaft 144 carries an operating handle 148 whereby the shaft 144 and arm 146 may be rotated to move the clutch sleeve 128 to the right. Preferably a mask slide 150 is mounted beneath the windows 126 and is connected by a fork arm 152 to be moved longitudinally to the left in Fig. 1 when the shaft 144 is rotated to disengage the clutch 136—138.

For the purpose of interlocking the operation of lever 148 with that of the control shaft 100 the slide 150 is provided with depending prongs 154 adjacent each drum 118. The drums are provided with slots 156 which are adapted to register with the prongs 154 only when drums 118 are each in zero indicating position. A hand wheel 158 may be provided for operating the control shaft 100. In the position of the parts illustrated in Fig. 1 the control shaft lies in the zero ratio position and the clutch operating handle 148 has been moved to direct drive position wherein the control shaft 100 is locked by engagement of prongs 154 with slots 156 and wherein the input shaft 20 is directly clutched to the output shaft 132 at 136—138. In this position of the slide 150 the openings 126 are preferably masked so that the numeral wheels cannot be read. If the clutch operating lever 148 be moved to clutch disengaging position the control shaft 100 is unlocked by movement of the slide 150 to the left of Fig. 1 and the input shaft is disconnected from the output shaft 132 by movement of the clutch sleeve 128 to the right.

The operation of the device to obtain various drive ratios between the shafts 20 and 132 may best be understood from a consideration of some of the principles involved in differential gearing. Considering a single planetary differential unit, such as that illustrated in Fig. 4, the ratios between any two of the three elements may be determined from the formula:

$$N_3 = \frac{N_1 + (R-1)N_2}{R}$$

where $N_1$ is the speed of the input member or sun gear, $N_2$ is the speed of the control member or orbit gear, and $N_3$ is the speed of the output member or the planet carrier. R is a quantity one greater than the ratio between the diameter of the sun gear and the diameter of the orbit gear. R is also the base number of the system upon which the gear change box of the present invention is constructed. In the present invention the value of $N_2$ is variable in R steps from zero up to $N_1$. Thus $N_2$ may be either zero, $$\frac{N_1}{R-1}, \frac{2N_1}{R-1}, \frac{3N_1}{R-1}$$

etc., up to $$\frac{(R-1)N_1}{R-1}$$

Considering now a transmission system in which there are three stages each comprising a planetary differential, the following table illustrates the manner in which arithmetical progression of the increments of output speed is obtainable. The ratio indicated is the ratio of output to input speed expressed as a decimal fraction. For the first stage the subscripts "1", "2" and "3" are used as above; for the second stage, "10", "20" and "30"; for the third stage, "100", "200" and "300". The stages are arranged from right to left in the table so that the $N_2$, $N_{20}$, and $N_{200}$ tabulations correspond with the units, tens, and hundreds digits of the ratio tabulation, and thus are read in the same manner as the dials of the device described are read. N is used as the speed of the input shaft to the device as a whole.

| Ratio | Stage 3 ($N_{100}=N_{30}$) | | | Stage 2 ($N_{10}=N_3$) | | | Stage 1 ($N_1=0$) | | |
|---|---|---|---|---|---|---|---|---|---|
| | $N_{300}$ | $\frac{N_{30}+9N_{200}}{10}$ | $N_{200}$ | $N_{30}$ | $\frac{N_3+9N_{20}}{10}$ | $N_{20}$ | $N_3$ | $\frac{N_1+9N_2}{10}$ | $N_2$ |
| .001 | .001N | $\frac{.01N+0}{10}$ | 0 | .01N | $\frac{.1N+0}{10}$ | 0 | .1N | $\frac{0+N}{10}$ | $\frac{N}{9}$ |
| .002 | .002N | $\frac{.02N+0}{10}$ | 0 | .02N | $\frac{.2N+0}{10}$ | 0 | .2N | $\frac{0+2N}{10}$ | $\frac{2N}{9}$ |
| ******** | ******** | ******** | ******** | ******** | ******** | ******** | ******** | ******** | ******** |
| .009 | .009N | $\frac{.09N+0}{10}$ | 0 | .09N | $\frac{.9N+0}{10}$ | 0 | .9N | $\frac{0+9N}{10}$ | N |
| .010 | .010N | $\frac{.10N+0}{10}$ | 0 | .10N | $\frac{0+N}{10}$ | $\frac{N}{9}$ | 0 | $\frac{0+0}{10}$ | 0 |
| .011 | .011N | $\frac{.11N+0}{10}$ | 0 | .11N | $\frac{.1N+N}{10}$ | $\frac{N}{9}$ | .1N | $\frac{0+N}{10}$ | $\frac{N}{9}$ |
| ******** | ******** | ******** | ******** | ******** | ******** | ******** | ******** | ******** | ******** |
| .019 | .019N | $\frac{.19N+0}{10}$ | 0 | .19N | $\frac{.9N+N}{10}$ | $\frac{N}{9}$ | .9N | $\frac{0+9N}{10}$ | N |
| .020 | .020N | $\frac{.20N+0}{10}$ | 0 | .20N | $\frac{0+2N}{10}$ | $\frac{2N}{9}$ | 0 | $\frac{0+0}{10}$ | 0 |
| .021 | .021N | $\frac{.21N+0}{10}$ | 0 | .21N | $\frac{.1N+2N}{10}$ | $\frac{2N}{9}$ | .1N | $\frac{0+N}{10}$ | $\frac{N}{9}$ |
| ******** | ******** | ******** | ******** | ******** | ******** | ******** | ******** | ******** | ******** |
| .099 | .099N | $\frac{.99N+0}{10}$ | 0 | .99N | $\frac{.9N+9N}{10}$ | N | .9N | $\frac{0+9N}{10}$ | N |
| .100 | .100N | $\frac{0+N}{10}$ | $\frac{N}{9}$ | 0 | $\frac{0+0}{10}$ | 0 | 0 | $\frac{0+0}{10}$ | 0 |
| .101 | .101N | $\frac{.01N+N}{10}$ | $\frac{N}{9}$ | .01N | $\frac{.1N+0}{10}$ | 0 | .1N | $\frac{0+N}{10}$ | $\frac{N}{9}$ |
| ******** | ******** | ******** | ******** | ******** | ******** | ******** | ******** | ******** | ******** |
| .999 | .999N | $\frac{.99N+9N}{10}$ | N | .99N | $\frac{.9N+9N}{10}$ | N | .9N | $\frac{0+9N}{10}$ | N |
| .000 | 0 | $\frac{0+0}{10}$ | 0 | 0 | $\frac{0+0}{10}$ | 0 | 0 | $\frac{0+0}{10}$ | 0 |
| 1.000 (Clutch 136-138 engaged.) | N | $\frac{0+0}{10}$ | 0 | 0 | $\frac{0+0}{10}$ | 0 | 0 | $\frac{0+0}{10}$ | 0 |

From this table it will be seen that the overall ratio of the transmission device illustrated in the drawings may be determined by the settings of the cams 104 at each stage. Rotation of the hand wheel 158 turns the control shaft 100 and with it the gear 114, sleeve 116, and dial 118, of the first stage. The cam 104 of the first stage is also rotated at one to one ratio with the hand wheel 158 through the medium of the idler gear 112. Starting from the position illustrated in Fig. 3 one-tenth revolution of the shaft 100 counterclockwise in Fig. 3 will move the cam 104 a corresponding amount so that the arm 98 is raised to release the detent 102 from gear 42 and the arm 94 which is pivoted on shaft 1 is permitted to fall into the notch of the cam 104 engaging the corresponding idler pinion 96 with the gear 42. In this position first stage dial 118 will read "one" while all other dials will remain in zero position being locked by the Geneva wheels 120 and transfer pinions 122. The orbit gear 36 is thus driven from the input shaft 20 through the pinion 46, gear 48, pinions 50 and 52, shaft 1, and gearing 90, 96, and 42 at one-ninth the speed of the input shaft 20. This setting corresponds to the first horizontal line in the table above.

If control shaft 100 be rotated further counterclockwise at each tenth revolution the next adjacent arm 94 drops into the notch of cam 104 while the previous one is lifted. Thus, after nine-tenths of a revolution of shaft 100, the shaft 9 will be driving the orbit gear 36 of the first stage at the same speed as the input shaft 20, corresponding to the third horizontal line in the above table. A further tenth revolution of the shaft 100 brings the transfer mechanism 120, 122, and 124 into operation rotating both the first and second stage sleeves 116 and cams 104 through one-tenth of a revolution. This position corresponds to the fourth line of the above table. Continued rotation of the control shaft 100 actuates the cams 104 and the dials 118 in a manner exactly analogous to the conventional odometer totalizer.

It is thus possible to select any overall ratio of power transmission through the device, the ratio selected being determined by the number of revolutions imparted to the control shaft 100 and being indicated directly by the dials 118. The control shaft 100 may be operated either forwards or backwards depending upon whether it is desired to increase the ratio from its previous adjustment or to decrease the same.

The shape of the notch in each of the cams 104 is preferably such that during any tenth of a revolution between one ratio setting and the next, two of the pinions 96 or one pinion 96 and the detent 102 may be engaged with the gear 42 or 44. By this construction it is insured that the orbit gear 36 will always be under positive control and will never be freed of connection with at least one of the driving shafts 1 through 9 or the detent 102. During the interval while two pinions are engaged, ring gear 36 is driven by the faster one of the two, while the other merely ratchets on its gear 42 or 44 until the cam 104 reaches the next even tenth of a revolution position; that is, with only one arm 94 in the notch. The direction of rotation of the input shaft 20 and the driving shafts 1 through 9 is preferably clockwise in Figs. 2 and 3 whereby the swinging action of the arms 94 is partially self-energized by the driving forces of the gears 90, 92, 96, 42 and 44. This feature is not essential, however, inasmuch as the springs 95 may be made sufficiently strong to hold the arm 94 in the notch of the cam 104 regardless of the driving reaction.

Referring now to Figs. 8 and 9 a modified form of the invention is disclosed. In this form the individual idler pinions 96 of Fig. 3 and the cam and swinging arms are replaced by a single internal-external idler ring gear 160. The idler gear 160 is carried by a circular plate 162 to which it is secured. The plate 162 is mounted for rotation on an eccentric 164 which takes the place of the cam 104, being driven by a gear 106 in the manner previously described. The idler gear 160 meshes on its external portion with the driving pinions 90 and 92 which in this form of the invention are so spaced as to have their peripheries equidistant from the center of the shaft 20. By slightly varying the proportions of the gears of the driving trains illustrated in Fig. 2 and of the gears 90 and 92, the same ratios between the shaft 20 and ring gear 36 may be provided with but a single gear 42' on the plate 34' which carries the orbit gear 36. The gear 42' meshes with the internal portion of the idler gear 160 on the opposite side of the shaft 20 from the point of engagement with any one of the gears 90 and 92. In place of the detent 102 a gear 92' is rotatably mounted on the dial sleeve 116 and is restrained against clockwise rotation by a pawl 102' pivoted on the transfer pinion shaft 124 and biased into engagement with the teeth of the gear 92 by a spring, not shown. Each of the gears 90 and 92 are driven from their corresponding shafts 1 through 9, inclusive, through roller clutches 166.

In this form of the invention the operation is identical to that previously described except that during the changeover from one ratio setting to the next adjacent one, two of the gears 90 or 92 will be in mesh with the idler ring gear 160 at once. The latter and the ring gear 36 will be driven at the speed of the faster one of the two gears, the roller clutch 166 of the slower gear or the detent 102' in the case of the gear 92' permitting the slower speed gear to rotate temporarily ahead of its driving shaft 1—9. Due to the engagement of the idler gear 160 with gear 42' on the opposite side of the axis, the output shaft in this modification will turn in the opposite direction to the input shaft.

This construction is particularly suitable for computing purposes wherein the control shaft 100 is connected to be driven continuously for feeding in one variable velocity, another variable velocity being fed in through the input shaft 20, the continuous product of these two variables appearing at the output shaft 132. In applications of this character it is also preferable to operate the control shaft 100 intermittently in ten steps per revolution; for example, by the use of a Geneva gear mechanism between shaft 100 and the shaft by which the latter is driven. Such a device is thus accurate to as many decimal places as there are stages of mechanism.

While the form of embodiment of the invention as herein disclosed, constitutes a preferred form, it is to be understood that other forms might be adopted, all coming within the scope of the claims which follow.

What is claimed is as follows:

1. A multiple ratio power transmission device comprising in combination an input shaft, an output shaft, a plurality of differentials connected in series between the input and output shafts and each having a third member by the speed of which the overall ratio of each differential may be controlled, and locking means and a plurality of driving trains common to all of said differentials and capable of selectively driving each of said third members at any of several speeds varying by equal increments from zero to input shaft speed, said differentials having a speed reduction factor when the third member is held stationary, equal to the number of speeds, including zero, at which the third members can be driven.

2. A multiple ratio gear set for providing speed ratios in arithmetical progression in a number system having a given base number greater than two, comprising a plurality of differentials with two members of each connected to adjacent differentials to provide a series connection, means for controlling the speed of the third member of each differential in a series of equal steps, identical for each differential, the number of such steps and the ratio of each differential with the third member locked being a function of the base number.

3. A multiple ratio power transmission device comprising in combination an input shaft, an output shaft, a plurality of differentials connected in series between the input and output shafts and each having a third member by the speed of which the overall ratio of each differential may be controlled, and means for controlling the speed of each of said third members in equal steps, including a cam associated with each differential.

4. A multiple ratio power transmission device comprising in combination an input shaft, an output shaft, a plurality of differentials connected in series between the input and output shafts and each having a third member by the speed of which the overall ratio of each differential may be controlled, and means for controlling the speed of each of said third members in equal steps, including a cam associated with each differential and arranged coaxially therewith.

5. A multiple ratio power transmission device comprising in combination an input shaft, an output shaft, a plurality of differentials connected in series between the input and output shafts and each having a third member by the speed of which the overall ratio of each differential may be controlled, means for controlling the speed of each of said third members in equal steps, the number of speeds, including zero, of each third member being equal to the reduction factor of each differential with the third member locked, the last-named means including a rotatable cam associated with each differential and transfer mechanism arranged between the cams of adjacent differentials.

6. A multiple ratio power transmission device comprising in combination an input shaft, an output shaft, a plurality of differentials connected in series between the input and output shafts and each having a third member by the speed of which the overall ratio of each differential may be controlled, means for controlling the speed of each of said third members in equal steps, the number of speeds, including zero, of each third member being equal to the reduction factor of each differential with the third member locked, the last-named means including a rotatable cam associated with each differential, transfer mechanism arranged between the cams of adjacent differentials, and an indicator driven with each cam, said indicators cooperating to show the ratio setting of the transmission as a whole.

7. A multiple ratio power transmission device comprising in combination an input shaft, an output shaft, a plurality of differentials connected in series between the input and output shafts and each having a third member by the speed of which the overall ratio of each differential may be controlled, locking means and a plurality of driving trains common to all of said differentials and capable of selectively driving each of said third members at any of several speeds varying by equal increments from zero to input shaft speed, said driving trains including a series of shafts arranged around the differentials and parallel to the axis thereof.

8. A multiple ratio power transmission device comprising in combination an input shaft, an output shaft, a plurality of coaxial differentials connected in series between the input and output shafts and each having a third member by the speed of which the overall ratio of each differential may be controlled, a plurality of driving trains connected to the input shaft and each including a shaft parallel to the axis of the differentials, and means for coupling each third member to any of said shafts independently of the other differentials.

9. A multiple ratio gear set for providing speed ratios in arithmetical progression in a number system having a base number greater than two, comprising a plurality of stages connected in series, one stage for each order of digits in the system, each stage including a planetary reduction gear having a reduction factor equal to the base number and having three members two of which are connected to adjacent stages and means for selectively driving the third member of each planetary gear at any one of a number of speeds including zero which number is equal to the base number.

10. A multiple ratio power transmission device comprising in combination an input shaft, an output shaft, a plurality of differentials connected in series between the input and output shafts and each having a third member by the speed of which the overall ratio of each differential may be controlled, locking means and a plurality of driving trains common to all of said differentials and capable of selectively driving each of said third members at any of several speeds varying by equal increments from zero to input shaft speed, said driving trains including a series of shafts arranged around the differentials and parallel to the axis thereof, gears carried by said shafts adjacent the third member of each stage, an idler gear for transmitting motion between said gears and said third member at each stage, and a carrier rotatable on the differential axis for positioning the idler gear to engage one or another of said gears.

11. A multiple ratio power transmission device comprising in combination an input shaft, an output shaft, a plurality of differentials connected in series between the input and output shafts and each having a third member by the speed of which the overall ratio of each differential may be controlled, locking means and a plurality of driving trains common to all of said differentials and capable of selectively driving each of said third members at any of several speeds varying by equal increments from zero to input shaft speed, said driving trains including a series of shafts arranged around the differentials and parallel to the axis thereof, gears carried by said shafts adjacent the third member of each stage, an internal-external idler gear for transmitting motion between said gears and said third member at each stage, and an eccentric carrier rotatable on the differential axis for positioning the idler gear to engage one or another of said gears.

12. A multiple ratio power transmission device comprising in combination an input shaft, an output shaft, a plurality of differentials connected in series between the input and output shafts and each having a third member by the speed of which the overall ratio of each differential may be controlled, and means for controlling the speed of each of said third members in equal steps, including a rotary member associated with each differential and arranged coaxially therewith for selective operation to different angular positions for different speed settings.

EDWIN L. ROSE.
RALPH L. TWEEDALE.